(No Model.)

E. SHAW.
HITCHING STRAP.

No. 484,646.  Patented Oct. 18, 1892.

ATTEST:
J. A. Hurdle
M. E. Clifton

INVENTOR:
Edgar Shaw
By J. N. McIntire
Attorney

UNITED STATES PATENT OFFICE.

EDGAR SHAW, OF SWAMPSCOTT, MASSACHUSETTS.

HITCHING-STRAP.

SPECIFICATION forming part of Letters Patent No. 484,646, dated October 18, 1892.

Application filed July 25, 1892. Serial No. 441,100. (No model.)

*To all whom it may concern:*

Be it known that I, EDGAR SHAW, of Swampscott, in the county of Essex and State of Massachusetts, have invented a certain new and useful Improvement in Halters; and I do hereby declare that the following is a full, clear, and exact description of the same, reference being had to the accompanying drawings, which form part of this specification.

As is well known to hostlers and everybody familiar with the care of horses and other animals which have to be tied up at night, the animal is liable to have its legs get entangled in some way with the tie-rope of the halter, especially if in tying up the animal the rope be left long enough to give him ample freedom in the stall, while, on the other hand, if the tie-rope be shortened up, so as to avoid the possibility of the animal getting "cast" by some entanglement of his limbs with the tie-rope, then he is likely to be uncomfortably restricted in lying down and getting up in the stall and is prevented from assuming a comfortable and restful position. To overcome this difficulty, distensible and contractile tie-ropes have heretofore been devised and patented; but nothing has, I believe, been heretofore made which fully answers the desired purposes. I propose to provide for use a tie-rope possessing the capacity to be drawn out to such length as to give the hitched animal sufficient freedom and to automatically contract when not under any draft strain, and one which will at the same time be simple but efficient in construction and economical of manufacture.

To this end and object my invention consists in the novel construction of tie-rope that will be found hereinafter described and claimed.

To enable those skilled in the art to which my improvement relates to make and use tie-ropes or hitching devices embracing my invention, I will now proceed to more fully describe the latter, referring by letters of reference to the accompanying drawings, which form part of this specification, and in which I have shown my said invention carried out in that particular form of tie-rope in which I have so far successfully practiced the invention, though, of course, it may be carried into effect under various modifications.

Figure 1:
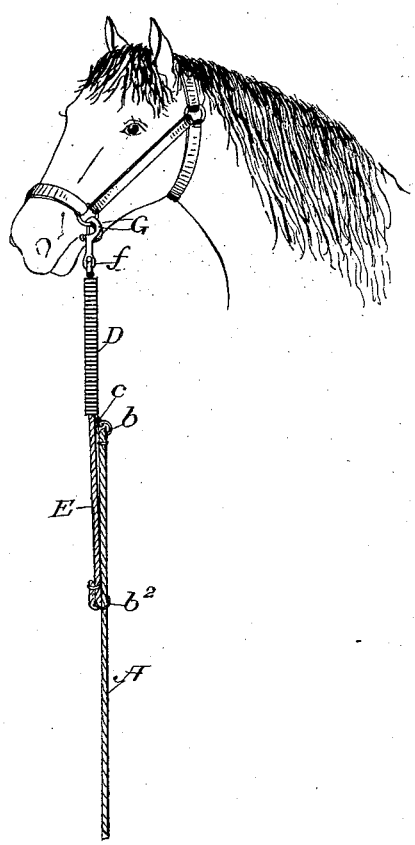
Figure 2:
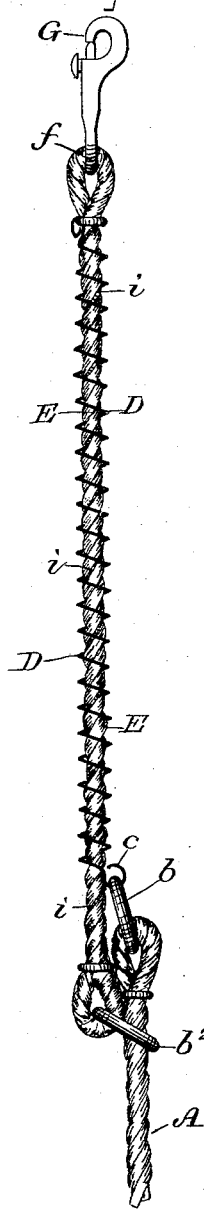
Figure 3:
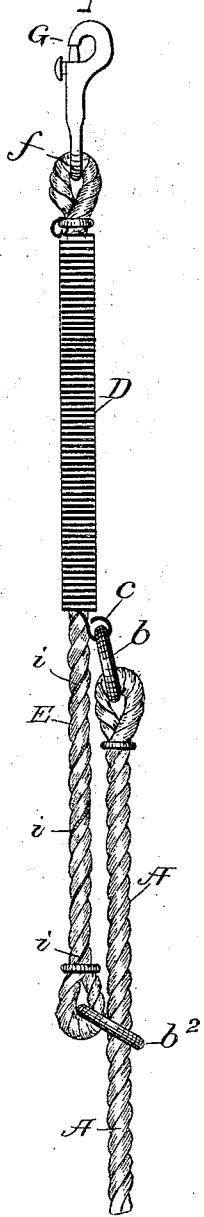

In the drawings, Figure 1 is a perspective view showing the head and neck portions of a horse having on a halter provided with one of my improved distensible and automatically-contractile tie-ropes. Fig. 2 is a view, on an enlarged scale, of the tie-rope, showing the latter distended or lengthened out, say, from twelve to fifteen inches, so as to be that much longer than when in the normal condition, as illustrated at Fig. 1. Fig. 3 is a view similar to Fig. 2, but showing the spring in its contracted or normal and the tie-rope in its shortest or natural condition.

In the several figures the same parts will be found always designated by the same letter of reference.

A is the main portion of a hitch-rope, which in practice is composed of the best Manila rope, one end of which, as shown, is formed and secured (in any suitable manner) into a sort of loop or eye, within which is interlinked a metallic ring $b$, which also engages with the integral eye or loop $c$ of a steel-wire spiral spring D. Within said coiled or spiral spring D is arranged one portion of a rope E, the outer end of which is suitably formed into a loop-like device, with which is interlinked the eye or loop-like portion $f$ of any suitable form or species of snap-hook G, adapted to be coupled or engaged, as illustrated at Fig. 1, with one of the rings of the halter or head-gear of the animal. The other portion of said rope E lies parallel with a portion of the rope A, as clearly shown, and is provided at its end loop with a metallic ring $b^2$, through which passes the rope A, all as clearly shown in the drawings. That end of the spiral spring D opposite to the one which is coupled to the metallic ring $b$ is securely fastened to the rope E near that end of said rope which is provided, as hereinbefore explained, with the snap-ring G. Preferably the rope E has combined with it a wrapping of wire $i$, which is designed to make the rope stiffer or less flexible, as and for a purpose to be presently explained.

In the use or operation of a tie-rope such as shown in the drawings and so far herein described the combined parts in their normal or natural condition occupy the relationship illustrated at Figs. 1 and 3, in which, as will be seen, while the spiral spring is in its normal or contracted condition that portion of the rope E which is not surrounded by said spring lies adjacent to and about parallel with a portion of the main rope A; but whenever any draft strain is exerted on the tie-rope the spiral spring will be distended, as shown at Fig. 2, (or to a less extent if the spring be not completely distended,) whereby nearly the whole length of the rope E will be surrounded by the distended spring, the length of the tie-rope as an entirety being thus increased, say, from twelve to fifteen inches, or to an extent equal to the distance which the ring $b^2$ will have been forced to slide along over the rope A before coming to a stop against the enlarged loop-like portion of said rope A, all as clearly ilustrated. Of course whenever the horse or other animal may have either partially or wholly distended or drawn out the distensible tie-rope the latter by the natural tendency of the spring D to contract will be shortened up and will resume its normal condition the moment the tie-rope shall be relieved of the undue draft strain which operated to distend it, and the strength of the spiral spring should be such as to insure this resumption of its natural or normal condition by the tie-rope, while at the same time the spring should be so easily distensible as not to offer any serious strain or uncomfortable obstruction to the movements of the head of the animal in thus distending the tie-rope.

The advantages of a tie-rope such as herein shown and described are so plain as to scarcely need explanation herein. Every person familiar with the care of horses or other animals will readily see and understand that by the use of a tie-rope such as shown, whereby all unnecessary and dangerous slack is avoided, while at the same time the hitched animal is free to lengthen the tie-rope sufficiently to permit such movements of the head in lying down and getting up as may be necessary for comfort, perfect comfort is afforded to the hitched animal, while all liability of his getting his limbs entangled with the tie-rope is wholly avoided.

I have found it expedient to stiffen or render more rigid the piece of Manila rope (marked E) by wrapping it, as shown, with a small wire; but this expedient may be dispensed with or some other one substituted for it, and in like manner others of the details of construction of the contrivance shown may be varied without changing the novel particulars of construction and mode of operation of my improved tie-rope.

What I therefore claim, broadly, as of my invention, and desire to secure by Letters Patent, is—

A tie-rope comprising two parts, one part having suitable attaching means at one end and a loose sliding connection with the other part at its other end, and a spiral spring uniting said two parts and encircling a portion of the first mentioned, the whole constructed, arranged, and operating in substantially the manner and for the purposes set forth.

In witness whereof I have hereunto set my hand this 19th day of July, 1892.

EDGAR SHAW.

In presence of—
MINNIE F. SUARTHOUT,
HERBERT J. CARY.